(12) United States Patent
Wang et al.

(10) Patent No.: US 12,578,802 B2
(45) Date of Patent: Mar. 17, 2026

(54) ELECTRICAL KEY SUPPORT MEMBRANE

(71) Applicant: Apple Inc., Cupertino, CA (US)

(72) Inventors: Paul X. Wang, Cupertino, CA (US); Dinesh C. Mathew, San Francisco, CA (US); Keith J. Hendren, San Francisco, CA (US); Shan Wu, Cupertino, CA (US); Simon R. Lancaster-Larocque, San Jose, CA (US)

(73) Assignee: APPLE INC., Cupertino, CA (US)

( * ) Notice: Subject to any disclaimer, the term of this patent is extended or adjusted under 35 U.S.C. 154(b) by 566 days.

(21) Appl. No.: 17/814,290

(22) Filed: Jul. 22, 2022

(65) Prior Publication Data

US 2022/0357802 A1 Nov. 10, 2022

Related U.S. Application Data

(63) Continuation of application No. 16/426,681, filed on May 30, 2019, now Pat. No. 11,397,473.

(60) Provisional application No. 62/733,549, filed on Sep. 19, 2018.

(51) Int. Cl.
| | |
|---|---|
| *G06F 3/02* | (2006.01) |
| *H01H 13/703* | (2006.01) |
| *H01H 13/704* | (2006.01) |
| *H01H 13/7065* | (2006.01) |
| *H01H 13/82* | (2006.01) |
| *H01H 13/83* | (2006.01) |

(52) U.S. Cl.
CPC ......... *G06F 3/0202* (2013.01); *H01H 13/703* (2013.01); *H01H 13/704* (2013.01); *H01H 13/7065* (2013.01); *H01H 13/82* (2013.01);

*H01H 13/83* (2013.01); *H01H 2219/036* (2013.01); *H01H 2223/002* (2013.01); *H01H 2233/07* (2013.01)

(58) Field of Classification Search
CPC ........ G06F 3/0202; G06F 1/1662; G06F 3/02; H01H 13/703; H01H 13/704; H01H 13/7065; H01H 13/82; H01H 13/83; H01H 2219/036; H01H 2223/002; H01H 2233/07; H01H 2213/01; H01H 2213/014; H01H 2215/02; H01H 3/12; H01H 3/125
See application file for complete search history.

(56) References Cited

U.S. PATENT DOCUMENTS

| | | | |
|---|---|---|---|
| 4,430,531 A | 2/1984 | Wright | |
| 5,144,103 A | 9/1992 | Suwa | |
| 7,960,663 B2 | 6/2011 | Yoshihiro | |
| 10,886,082 B1 * | 1/2021 | Wang | H01H 13/83 |
| 10,984,969 B1 * | 4/2021 | Wang | G06F 3/0202 |
| 11,397,473 B1 * | 7/2022 | Wang | H01H 13/82 |
| 2006/0042923 A1 | 3/2006 | De Richecour et al. | |

(Continued)

*Primary Examiner* — Lheiren Mae A Caroc
(74) *Attorney, Agent, or Firm* — Dorsey & Whitney LLP

(57) ABSTRACT

Keyboards and other input devices are provided with membranes that extend under the keycaps or buttons. The membranes are flexible and can support conductive structures, traces, and electrical switch connections to enable effective key switches, lighting, and fluid-tightness for the keyboard. The flexible membrane is positioned near the keycaps to prevent ingress of fluids and debris into the lower portions of the key assemblies. In some cases, the flexible membrane also provides support for an interstitial layer that extends between keycaps.

20 Claims, 10 Drawing Sheets

(56)　　　　　References Cited

U.S. PATENT DOCUMENTS

| 2012/0160648 | A1 | 6/2012 | Chao et al. |
| 2018/0068808 | A1 | 3/2018 | Wang et al. |

\* cited by examiner

ELECTRICAL KEY SUPPORT MEMBRANE

CROSS-REFERENCE TO RELATED APPLICATION(S)

This is a continuation of U.S. patent application Ser. No. 16/426,681, filed 30 May 2019, and entitled "ELECTRICAL KEY SUPORT MEMBRANE," which claims priority to U.S. Provisional Patent Application No. 62/733,549, filed 19 Sep. 2018, and entitled "ELECTRICAL KEY SUPPORT MEMBRANE," the disclosures of which are hereby incorporated by reference in their entireties.

FIELD

The described embodiments relate generally to keyboards and input devices for computers and other electronic devices. More particularly, the present embodiments relate to flexible electrical structures used in keyboards.

BACKGROUND

Electronic devices use a variety of different input devices. Examples of such input devices include keyboards, computer mice, touch screens, buttons, trackpads, and so on. They may be incorporated into an electronic device or can be used as peripheral devices. The electronic device may be vulnerable to contaminants, such as dust or liquid, entering though openings or connections in or around one or more incorporated input devices or external input devices. The external input devices may themselves be vulnerable to contaminants entering through various openings or connections. The device may also implement lighting at the user interface.

Keyboards typically involve a number of moving keys. Liquid ingress around the keys into the keyboard can damage electronics. Residues from such liquids, such as sugar, may corrode or block electrical contacts, prevent key movement by bonding moving parts, and so on. Solid contaminants (such as dust, dirt, food crumbs, and the like) may lodge under keys, blocking electrical contacts, getting in the way of key movement, and so on. These devices can be undesirably expensive to make and assemble.

Thus, there are many challenges and areas for improvements in input devices.

SUMMARY

Aspects of the present disclosure relate to a keyboard having a housing, a controller connection to provide an electrical connection to a keyboard controller, a flexible membrane having a set of conductive structures, with each conductive structure of the set of conductive structures being electrically connected to the controller connection, a set of keycaps positioned on an outer side of the flexible membrane, and a set of keycap supports positioned on an inner side of the flexible membrane. The set of keycap supports can be supported by the housing.

In some embodiments, the flexible membrane can include a first layer portion having a first conductive structure of the set of conductive structures, a second layer portion having a second conductive structure of the set of conductive structures, and a spacer vertically separating a first conductive structure from the second conductive structure. The flexible membrane can be deformable to bring the first conductive structure into electrical communication with the second conductive structure, and the first layer portion and the second layer portion can extend under multiple keycaps of the set of keycaps. The first layer portion can extend under multiple keycaps of the set of keycaps, and the second layer portion can extend under one of the multiple keycaps.

The flexible membrane can be fluid-tight, and can have a light source electrically connected to a conductive structure of the set of conductive structures. The flexible membrane can have a vent aperture permitting air to be redistributed through or external to the membrane. The membrane can be substantially flat or can have a set of locally raised portions corresponding to the positions of the keycaps of the set of keycaps.

Another aspect of the disclosure relates to a button for an electronic device. The button can include a button cap and an elastic support layer attached to the button cap. The elastic support layer can have a set of conductive traces providing conductive paths across the elastic support layer. The button can also include a set of support structures supporting the elastic support layer and the button cap, wherein application of a force to the elastic support layer deforms the elastic support layer and enables electrical communication between two conductive paths in the set of conductive traces.

Application of the force can cause the two conductive paths to contact each other. Application of the force can also cause a bridge conductor to electrically contact the two conductive paths. The bridge conductor can be positioned on a collapsible dome. The set of support structures can have a collapsible dome configured to deform upon application of the force and a stabilizer configured to limit rotational movement of the button cap upon application of the force. The elastic support layer can have a collapsible dome portion. A flexible layer can be included that is positioned around a perimeter of the button cap, with the flexible layer being supported by the elastic support layer. The button cap can be positioned on an upper side of the elastic support layer. The button cap can be positioned on an underside of the elastic support layer.

Yet another aspect of the disclosure relates to a keyboard that includes a housing having a rigid web portion, a first flexible support layer having a lower portion and a raised portion, with the raised portion being raised relative to the lower portion and with the lower portion being attached to the rigid web portion of the housing, a second flexible support layer being attached to the raised portion of the first flexible support layer and being vertically spaced above and positioned over the lower portion, and a keycap positioned above the raised portion of the first flexible support layer.

Application of a force to the keycap can cause the keycap to travel and deform the first and second flexible layers without the travel being limited by the rigid web portion. The second flexible support layer can include a fabric material. A third flexible support layer and a keycap support can be included as well, wherein the third flexible support layer is positioned between the keycap support and the housing.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
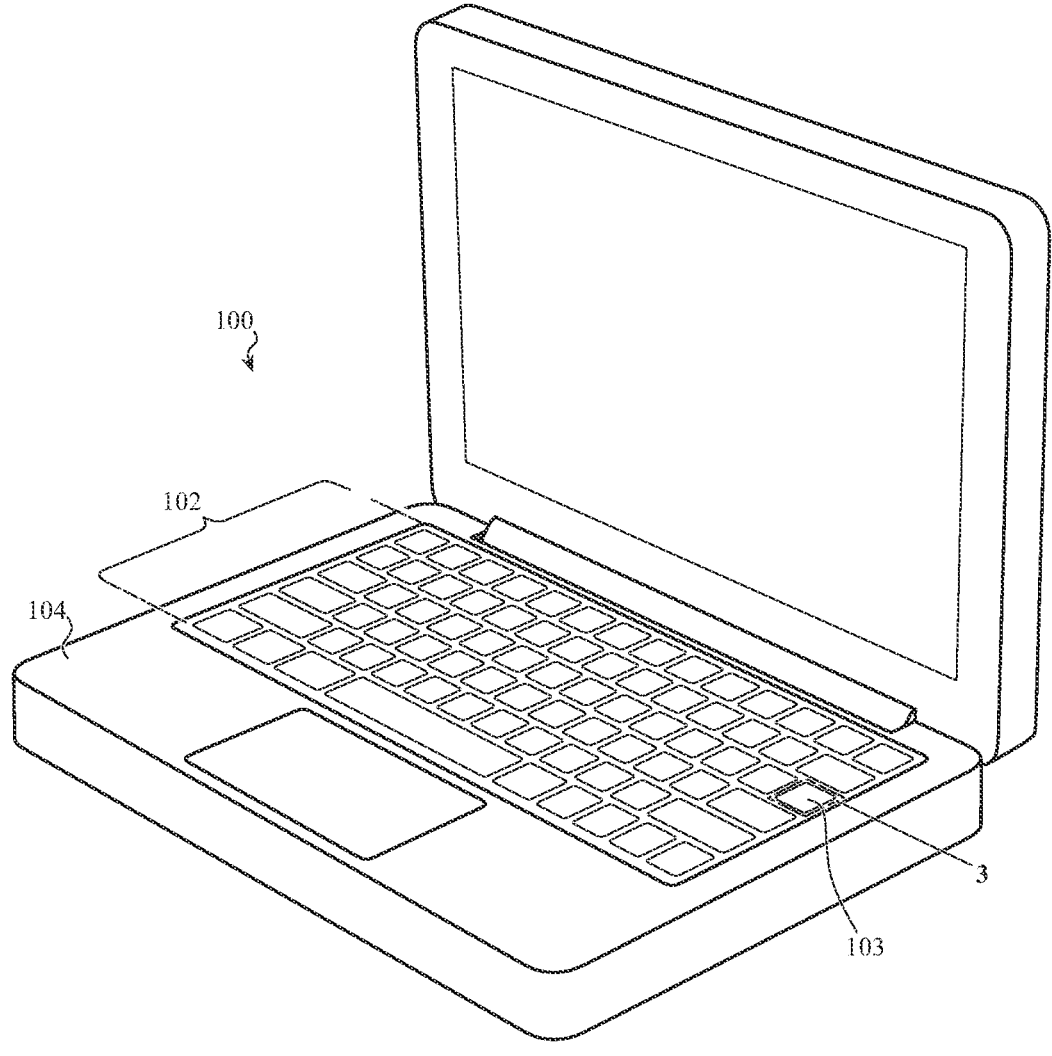
FIG. 1 shows an isometric view of an electronic device according to an embodiment of the present disclosure.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems and apparatuses that embody various elements of the present disclosure. However, it should be understood that the described disclosure can be practiced in a variety of forms in addition to those described herein.

The present disclosure relates to keyboards and/or other input devices that include mechanisms that prevent and/or alleviate contaminant ingress, provide electrical switches, reduce the thickness of and the number of parts in the key assembly, and provide and distribute light through the keyboard. These mechanisms can include keyboard membranes or gaskets and structures such as pads, fabric sheets, skirts, elastomer or other bands.

Aspects of the disclosure relate to a membrane or other type of flexible layer to which keycaps or button caps are connected in a keyboard. The flexible membrane can limit or prevent ingress of fluids or debris to parts of the keyboard below the membrane. The membrane can be positioned between outer keycaps and inner portions of the keyboard such as inner keycaps, collapsible domes, stabilizers (e.g., a butterfly or scissor hinge mechanism), and base components (e.g., a substrate, base layer, housing, etc.). Fluid and debris that falls between the keycaps can be blocked and held by the membrane at a location where it can be more easily cleaned off or otherwise removed from the keyboard. The fluid and debris can also thereby be prevented from coming into contact with electrically charged portions of the keyboard or interfering with the function of domes, stabilizers, and other moving parts of the keyboard.

The membrane can also include electrically conductive material to form conductive structures, conductive paths, or circuitry on the surface of, or within, the membrane. Portions of the membrane can be operated as deformable switches that produce electrical signals in the manner traditionally provided by switches and traces on a substrate (e.g., a printed circuit board (PCB)). In some cases, domes or other deformable structures are attached to the membrane and comprise conductive portions that are configured to contact and enable electrical communication between portions of the conductive material of the membrane. Integrating the conductive material into the membrane can reduce the number of parts in the keyboard and can relocate switch structures away from a substrate.

The membrane can also include light sources and other light-distributing features such as light-emitting diodes (LED) and reflective or light-diffusive shapes and materials to provide lighting in and around the keycaps connected to or otherwise associated with the membrane. The light-emitting components can have their electrical connections established by the conductive structures in the membrane. The membrane can distribute the light through its thickness, through domes connected to the membrane, or with another diffuser or reflector attached to the membrane. Thus, the membrane can allow the keyboard to have its light sources positioned nearer to keycaps to improve their efficiency and to help direct the light to where it is most beneficial.

In some configurations, the membrane includes internal voids from which air can be redistributed throughout the membrane (or redistributed out of the membrane) when the membrane deforms. Thus, the membrane can be used to support or provide a variety of keyboard functions.

Additional embodiments, features, and details will be provided with reference to the figures. FIG. 1 depicts an electronic device 100 including a keyboard 102. The keyboard 102 includes keys or key assemblies with keycaps 103 or button caps that move when depressed by a user. The electronic device 100 can include one or more mechanisms that prevent or alleviate contaminant ingress into or through the keyboard 102, such as ingress between the keycaps 103 and into a housing 104 of the electronic device 100. Such mechanisms can include a flexible membrane extending across or underneath the keycaps 103. Such contaminants can include liquids (e.g., water, soft drinks, sweat, and the like), solids (e.g., dust, dirt, skin particles, food particles, and the like), and any other small debris or foreign material.

Figure 2:
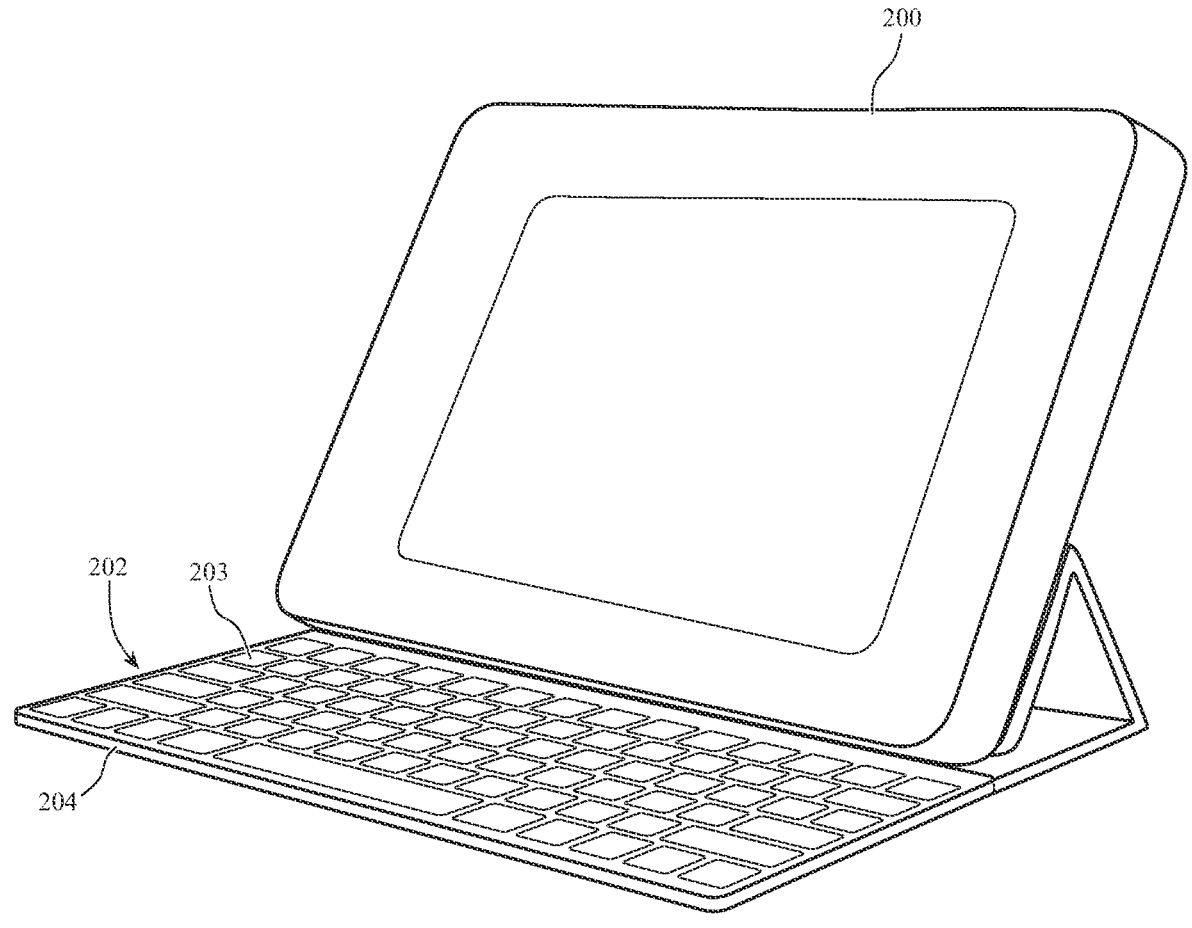
FIG. 2 shows an isometric view of another electronic device according to an embodiment of the present disclosure.

FIG. 2 illustrates a tablet computer 200 connected to a keyboard 202. The keyboard 202 is a peripheral device connected to the tablet computer 200 rather than being an integral part of the tablet computer 200. The keyboard 202 can also include keycaps 203 and a housing 204 that are separate from, but attachable to, the tablet computer 200. As explained below, the keycaps 203 can be positioned on top of (or, in some embodiments, underneath) a flexible membrane.

Although the electronic device 100 of FIG. 1 is a notebook/laptop computer and a tablet computer 200 is shown in FIG. 2, it will be readily apparent that features and aspects of the present disclosure that are described in connection with the notebook computer and tablet computer 200 can be applied in various other devices. These other devices can include, but are not limited to, personal computers (including, for example, computer "towers," "all-in-one" computers, computer workstations, and related devices) and related accessories, speakers, graphics tablets and graphical input pens/styluses, watches, headsets, other wearable devices, and related accessories, vehicles and related accessories, network equipment, servers, screens, displays, and monitors, photography and videography equipment and related accessories, printers, scanners, media player devices and related accessories, remotes, headphones, earphones, device chargers, computer mice, trackballs, and touchpads, point-of-sale equipment, cases, mounts, and stands for electronic devices, controllers for games, remote control (RC) vehicles/drones, augmented reality (AR) devices, virtual reality (VR) devices, home automation equipment, and any other electronic device that uses, sends, or receives human input. Thus, the present disclosure provides illustrative and non-limiting examples of the kinds of devices that can implement and apply aspects of the present disclosure.

Figure 3:
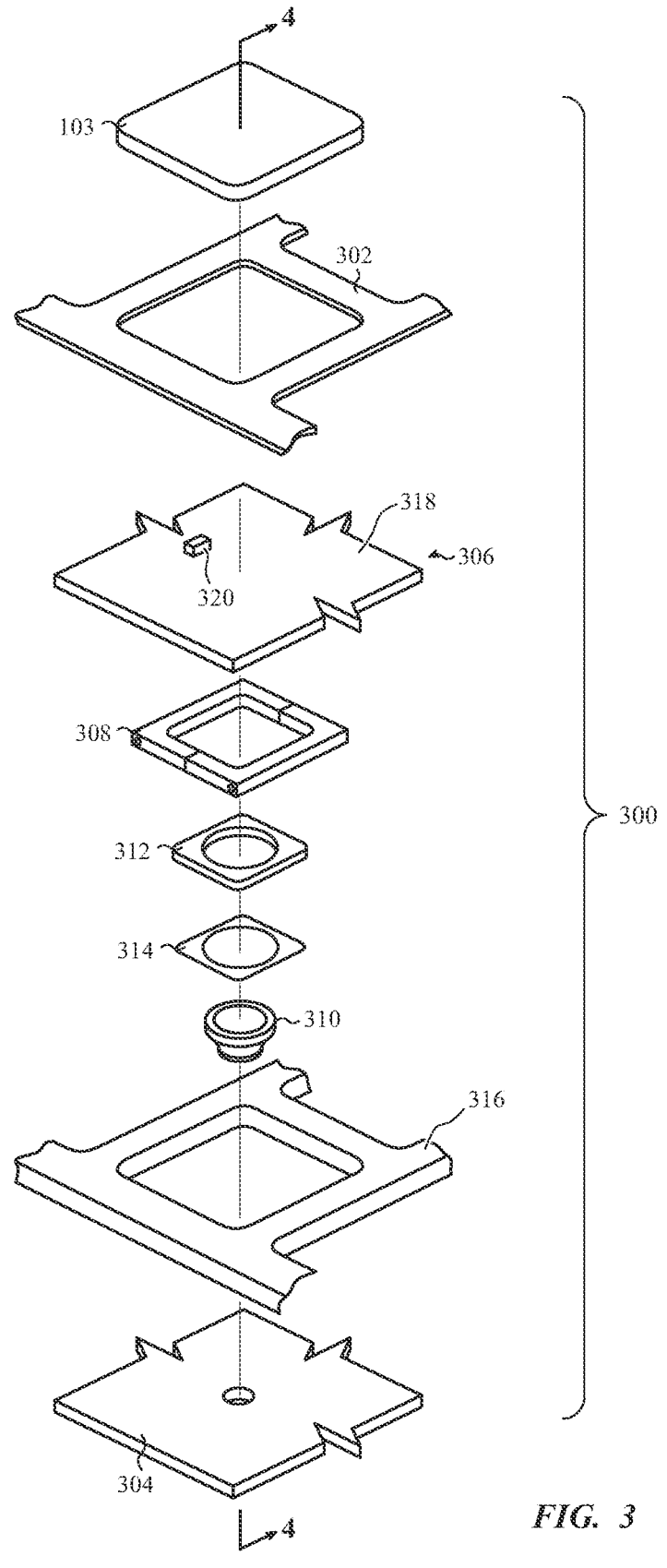
FIG. 3 shows an exploded view of a key assembly shown at box 3 in FIG. 1.
Figure 4:
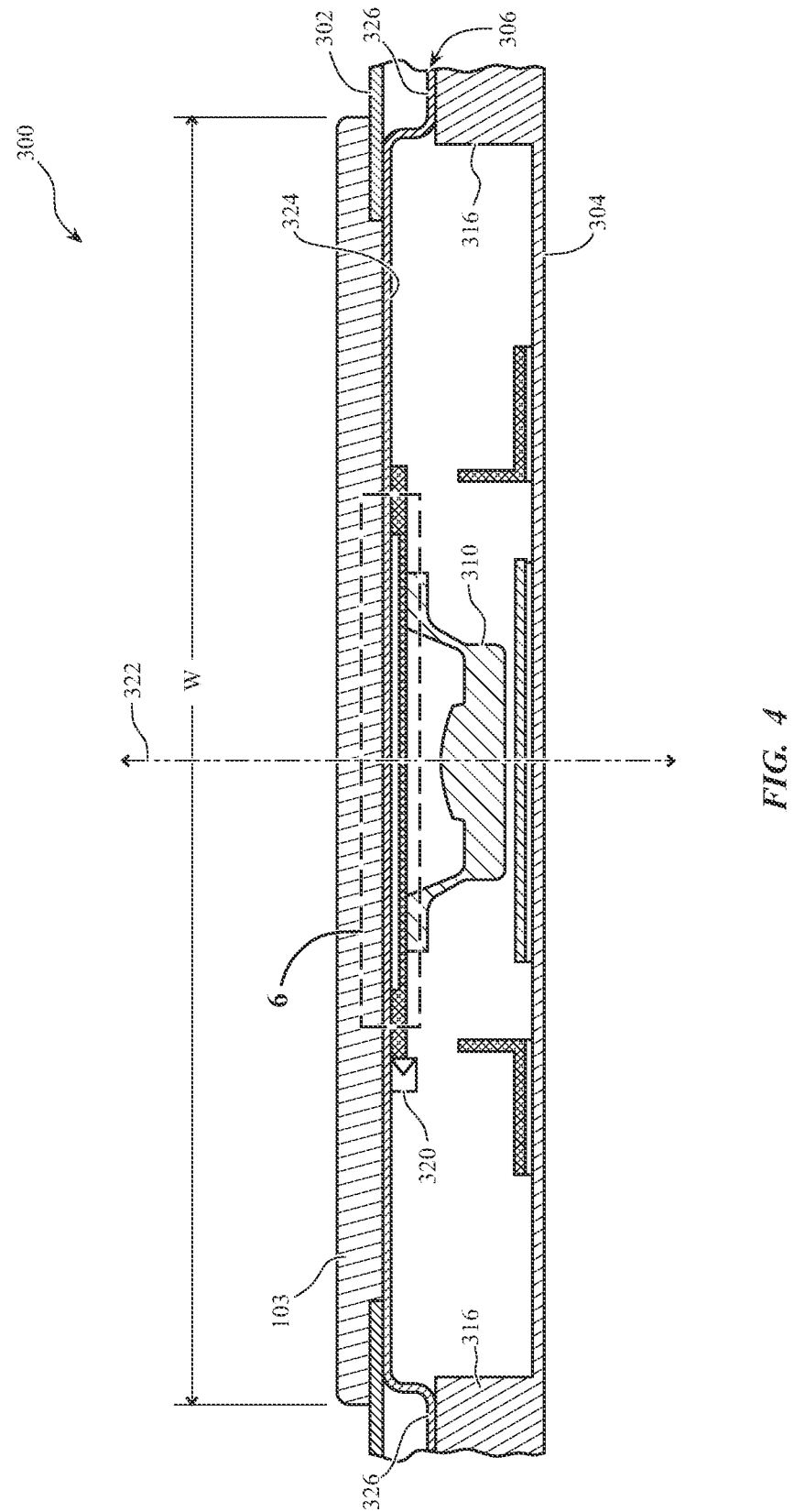
FIG. 4 is a non-exploded side section view of the key assembly of FIG. 3, as indicated by section line 4-4.

The keyboard 102 can include a set of assembled components that correspond to each key. The assembly of these components can be referred to as a "stack-up" due to their substantially layered configuration. FIG. 3 illustrates partial exploded view of an assembly 300 corresponding to one of the keys in keyboard 102, as indicated by box 3 in FIG. 1. One or more assemblies 300 can be implemented in the keyboard 102, such as one for each keycap 103 or button. Some of the parts of the assembly 300 can span multiple keys or can extend beyond the limits shown in FIG. 3 in one or more directions, as indicated by jagged edge lines. For example, as explained herein, the base layer 304 and membrane 306 can extend across the underside of all of the keys in the keyboard 102. FIG. 4 shows a simplified section view of the keyboard assembly 300 in an assembled condition, as indicated by section line 4-4 in FIG. 3. Some parts are not shown in FIG. 4 in order to provide clarity regarding the relationship between other parts.

As shown in FIGS. 3-4, a keyboard assembly 300 can include a keycap 103, a first flexible support layer (i.e., an interstitial layer 302) positioned at least partially under and around the base of the keycap 103, a second flexible support layer (i.e., a flexible membrane 306, which may also be referred to as an elastic support layer) positioned under the interstitial layer 302, a hinge mechanism (i.e., key stabilizer 308), a collapsible dome 310, a dome support 312, an adhesive layer 314, a stiffening structure (e.g., a web 316), and a base layer 304.

The keycap 103 can provide a surface against which the user can interface with the keyboard assembly 300. Thus, the keycap 103 can be movable between an unactuated state at a first vertical position relative to the base layer 304 and an actuated state at a second vertical position relative to the base layer 304. The keycap 103 can comprise a rigid material such as a hard plastic, metal, or ceramic material. In an example embodiment, the keycap 103 includes a glass or polymer. The keycap 103 can therefore include a glyph or symbol (not shown) on its surface. In some cases, the keycap 103 can be at least partially transparent or translucent, thus allowing light to be transferred through the keycap 103. The light can be directed through or around a glyph or symbol of the keycap 103 in order to improve its contrast and readability. In some embodiments, light is directed through or around an outer perimeter of the keycap 103. The keycap 103 can be positioned on an outer side (e.g., a top side) of the flexible membrane 306 or can be positioned on an inner side thereof (e.g., a bottom side). In some configurations, the keycap 103 can be embedded in the flexible membrane 306. For example, the flexible membrane 306 material can be overmolded to the top of the keycap 103. An overmolded membrane 306 can provide a seal around multiple sides of the keycap 103 and can help prevent the keycap 103 from being dislodged from the membrane 306 or being damaged. In other embodiments, the keycap 103 can be attached to the flexible membrane 306 by an adhesive material such as a glue, adhesive, or tape. In various cases, the keycap 103 can have a flat top surface or a dished or cylindrical "scooped" top surface.

In some embodiments, a keycap 103 is on the outer side of the flexible membrane 306 and a second keycap is positioned on the inner side thereof. The outer keycap can provide key feel/definition and the visual appearance of the key for the user, and the inner keycap can be configured to connect to the key stabilizer 308, dome 310, and any other components below the flexible membrane 306. The keycap 103 can alternatively comprise a connection to the key stabilizer 308 through the flexible membrane 306 without use of a second or inner keycap.

The interstitial layer 302 can extend between adjacent keycaps 103 and can span the gaps (i.e., interstices) between the keycaps 103. See FIG. 4. The interstitial layer 302 can comprise a flexible material such as fabric, rubber, silicone, flexible polymer (e.g., thermoplastic polyurethane (TPU)), HYTREL®, related materials, or combinations thereof. The interstitial layer 302 can therefore be referred to as a fabric layer or a first flexible layer. The material used in the interstitial layer 302 can be configured to be deflectable upon application of a force to a keycap 103 with which it is connected or against which it rests. Thus, the interstitial layer 302 can at least locally move along with a keycap 103 in a downward direction (e.g., toward web 316) when a vertically oriented force is applied to the keycap 103. The interstitial layer 302 can be configured to be flexible enough that pressing one keycap 103 does not cause other nearby keycaps to significantly move as a result of the movement of the interstitial layer 302. However, the interstitial layer 302 can also be rigid enough that it does not sag between the keycaps when they are in an unactuated state.

In some embodiments, the interstitial layer 302 is attached to the keycap 103. The keycap 103 can be mounted to a top or inside surface of the interstitial layer 302 or the keycap 103 can be integrally formed with the interstitial layer 302. For example, the keycap 103 can be adhered, co-molded, or overmolded with the interstitial layer 302. Thus, the keycaps 103 and interstitial layer 302 can form a single layer or sheet extending across the keyboard. In other embodiments, the interstitial layer 302 is not attached to the keycap 103 or is omitted. If the interstitial layer 302 is not attached to the keycap 103, it can be supported from below by the flexible membrane 306 to help position the interstitial layer 302 in contact with the underside of the keycaps 103, even while the keycaps 103 move.

The flexible membrane 306 extends under the keycap 103 and interstitial layer 302. The flexible membrane 306 can be flexible and deflectable in response to application of a downward force on the keycap 103. Thus, the keycap 103 can contact the top of the flexible membrane 306 and deform part of the membrane 306 when a sufficient force is applied to the keycap 103. The flexible membrane 306 can comprise a thin, flexible material such as HYTREL® from DUPONT™, thermoplastic polyurethane (TPU), rubbers, polyethylene terephthalate (PET), other thermoplastic materials, related flexible materials, and combinations thereof. In some embodiments, the flexible membrane 306 can comprise multiple materials, wherein portions of the flexible membrane 306 that are localized directly underneath hard keycaps 103 can comprise a relatively rigid material (e.g., PET), and portions between keycaps 103 (e.g., adjacent to lower portion 326) can comprise a relatively more flexible material (e.g., PET with reduced thickness, TPU, or a similar material). Using a more rigid material under the keycaps 103 can reduce the effects of fatigue caused by contact between the dome and the under-key portions of the flexible membrane 306.

The membrane 306 can provide a fluid-tight barrier between an outer side/upper side 318 of the membrane 306 (i.e., the top side shown in FIG. 3 facing toward the keycap 103) and an inner side/lower side thereof (i.e., the bottom side facing toward the base layer 304 opposite the outer side 318). The fluid-tight barrier can prevent ingress of air, water, and other fluids from the outer side 318 to the inner side. In some embodiments, the membrane 306 can be fluid-tight across the entire keyboard, such as being fluid-tight across the entire width of the membrane 306 or across the entire width that is located under the width of the keycaps. Specifically, the outer side 318 of the membrane 306 can be fluid-tight. The inner side can potentially include openings or vents, as explained below.

The flexible membrane 306 can support the interstitial layer 302 and keycap 103. Thus, when the keycap 103 and the interstitial layer 302 move downward along the central axis 322 (see FIG. 4), the flexible membrane 306 can keep the interstitial layer 302 in contact with the bottom of the keycap 103. The flexible membrane 306 can therefore include a raised portion 324 that is positioned vertically higher than a lower portion 326, and the raised portion 324 can deflect downward as the keycap 103 moves. The lower portion 326 can be positioned on the web 316 and can be attached to the web 316 to limit upward movement of the flexible membrane 306. The flexible membrane 306 can be configured to be flexible enough to provide very little resistance to the movement of the keycap 103.

The flexible membrane 306 can comprise conductive structures (e.g., conductive traces or wires) that extend through the flexible membrane 306 to the locations of each keycap 103. The conductive structures can comprise an electrically conductive material, such as, for example, silver, copper, aluminum, other conductors, and combinations thereof. The conductive structures are described in greater detail in connection with FIGS. 5-9 below.

The flexible membrane 306 can have conductive structures connected to a light source 320 positioned on or in the membrane 306. The light source 320 can be a light-emitting diode (LED) or related electronic device configured to output light in response to an electrical signal. Thus, the conductive structures on or in the membrane 306 can provide power to the light source 320. The light source 320 can be a directional light source such as, for example, a directional LED configured to emit light primarily in one direction or through a limited range of angles relative to a central axis extending through the light source 320. In various embodiments, the light source 320 can emit light laterally into a side surface of the membrane 306 (e.g., into the lateral side of puck 504; see FIGS. 4 and 6), laterally into the collapsible dome 310, vertically into a bottom surface of the membrane 306 (see, e.g., light source 1020 of FIG. 10), or at an angle toward the center of the keycap 103.

As shown in FIG. 4, the light source 320 can be positioned radially outward from the dome 310 relative to the central axis 322 and can therefore shine its light in a radially inward direction relative to the central axis 322. In another embodiment, the light can be directed primarily parallel to the central axis 322. The light source 320 can be positioned under the keycap 103 and can, in conjunction with the membrane 306 and any other structures into which the light shines, illuminate the bottom and/or perimeter of the keycap 103, thereby improving the visibility of the outer limits of the keycap 103 or improving the visibility of a translucent glyph- or symbol-forming portion of the keycap 103, especially in low-light environments. The surfaces of the membrane 306, dome 310, and any other nearby components can be configured to reflect or diffuse light in a desired direction (e.g., upward) or toward a border, glyph, or symbol of the keycap 103.

Because the light source 320 is positioned on the flexible membrane 306, the light source 320 can move with the flexible membrane 306, thereby improving the consistency of the brightness of the light emitted through or around the keycap 103 as compared to conventional lighting that is positioned at or near the base layer 304. The distance between the key glyph/key symbol/perimeter of the keycap 103 and the light source 320 can be consistent irrespective of the position of the keycap 103 relative to the base layer 304. Additionally, because the light source 320 is located very close to the keycap 103, the light can be more focused on its intended target (e.g., through the glyph) instead of having to be reflected or diffused through material to reach the target. Thus, the light source 320 can appear brighter or can be a less energy-consuming source of light than conventional keycap light sources.

The key stabilizer 308 can comprise mechanical hinge or related mechanism configured to stabilize the movement of the keycap 103 as it vertically travels through a movement cycle. The stabilization can limit or prevent the keycap 103 from rotating when an off-center-oriented vertical force is applied to the top of the keycap 103 (e.g., a force applied laterally offset from, but parallel to, center axis 322). In some embodiments, the key stabilizer 308 keeps the keycap 103 substantially parallel to the base layer 304 or another horizontal plane when the keycap 103 is also oriented horizontally in its unactuated or neutral state. Thus, the key stabilizer 308 can include a scissor mechanism, butterfly mechanism, or related device used to stabilize keys in keyboards. The key stabilizer 308 can comprise a rigid material and can be optically translucent or transparent to help distribute light throughout the underside of the keycap 103.

The key stabilizer 308 can include features configured to attach to the keycap 103. For example, the keycap 103 can have structures (e.g., hooks and clamping features, not shown) configured to clip or lock onto corresponding structures (not shown) on the key stabilizer 308. The structures connecting the key stabilizer 308 and the keycap 103 can extend through the flexible membrane 306 if the keycap 103 is positioned on the upper side of the membrane 306. Any openings through the flexible membrane 306 that facilitate that connection can be sealed and fluid-tight. In some configurations, such as when the keycap 103 or an inner keycap is positioned under the membrane 306, these connecting structures do not extend through the membrane 306.

The collapsible dome 310 can provide resistance and tactile feedback to the user when the keycap 103 is pressed. The collapsible dome 310 can also be used to bias the keycap 103 vertically upward when the keycap 103 has been at least partially depressed. Thus, the collapsible dome 310 can comprise a compressible or collapsible material configured to resiliently change shape upon application of a force to the dome 310. The material can comprise rubber, silicone, another related flexible material, and combinations thereof.

In some embodiments, the collapsible dome 310 can include a conductive material configured to permit electrical current to flow through the dome 310. See, e.g., FIG. 9 and its related descriptions herein. The collapsible dome 310 can have a top surface contacting or attached to the membrane 306 and a bottom surface contacting or attached to the base layer 304.

The dome support 312 can provide a structure within which the dome 310 is positioned. The dome support 312 can be positioned above the base layer 304 and can substantially surround the dome 310. In some embodiments, the dome support 312 is affixed or coupled directly to the membrane 306 or base layer 304. An adhesive layer 314 can be positioned between the dome support 312 and the structure(s) to which it is attached. The dome support 312 can be located within the key stabilizer 308 and can include features for coupling to the key stabilizer 308. For example, a butterfly mechanism key stabilizer can be pivotally coupled to the dome support 312 along the central pivot axes of the butterfly mechanism. The dome support 312 can comprise a rigid material and can be optically translucent or transparent to help distribute light underneath the keycap 103. In some embodiments, the dome support 312 is omitted and/or the key stabilizer 308 can be pivotally connected to connective structures formed in or directly coupled to the base layer 304.

The web 316 is a rigid structure positioned below the keycap 103 and flexible membrane 306. The web 316 can be a separate part attached to the base layer 304 or can be integrally formed with the base layer 304 (e.g., a molded part of the base layer 304 or a shape formed in a milled base layer 304). The web 316 can provide structural stiffness to the base layer 304 and can be a structure that other components are mounted to, such as the flexible membrane 306. The web 316 can be configured with a height so that its top surface is positioned below the vertical position of the bottom of the keycap 103 when the keycap 103 is at its most actuated/deflected position relative to the base layer 304. In this manner, the web 316 does not come into contact with the keycap 103 even when the keycap 103 is completely pressed. As such, the web 316 does not limit the movement of the keycap 103 or cause the keycap 103 to have a hard and limiting "bottom-out" against the web 316. The maximum deflection position of the keycap 103 can be above the top surface of the web 316. When using the keycap 103 normally, the user may not feel the rigid web 316, even when the user's finger presses down between two keycaps 103. Accordingly, this arrangement can help limit the hard, jarring feeling of a user's finger hitting a rigid, unyielding surface while typing.

Some conventional keyboards have a rigid web between each keycap, so the web needs to be positioned well below the tops of the keycaps to prevent the user from hitting the web when their finger hits a keycap near its edge. However, this can leave open space between the top edges of the keycaps, so debris and material can fall between, and potentially under, the keycaps. The embodiments of the present disclosure provide an interstitial layer 302 and/or membrane 306 that are near the top surface of the keycap 103 and that can block or limit debris and fluids from penetrating between adjacent keycaps 103. The interstitial layer 302 and membrane 306 can be compliant when pressed by a finger, so the problem of having rigid structures between the keycaps 103 and near the top of the keycaps 103 can be alleviated or avoided.

The base layer 304 can be a housing or other rigid base structure of the keyboard assembly 300. The base layer 304 can also comprise a substrate such as, for example, a printed circuit board (PCB) having conductive traces and other electrical components. In some embodiments, the light source 320 is positioned on the base layer 304 and light from the light source is directed up into the membrane 306 and redistributed laterally through the membrane into and around the keycap 103. In some embodiments, the base layer 304 includes brackets for retaining a key stabilizer 308 to the base layer 304.

Figure 5:
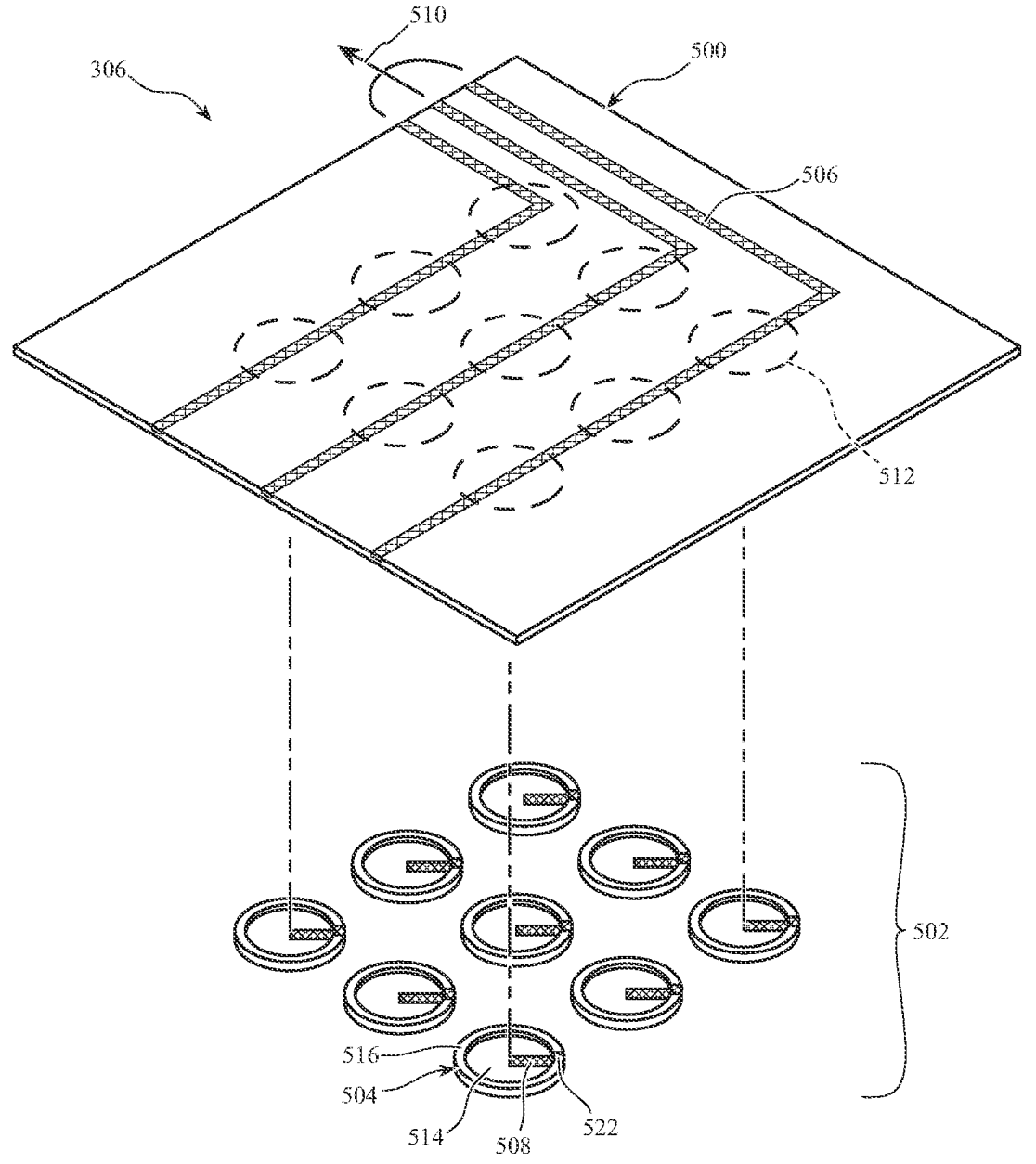
FIG. 5 is an exploded view of a membrane according to an embodiment of the present disclosure.
Figure 6:
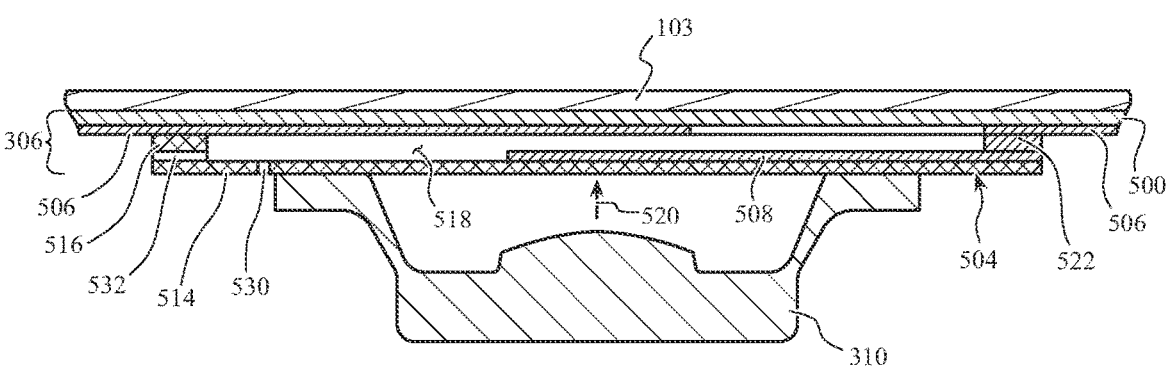
FIG. 6 is a side section view of a key assembly incorporating the membrane of FIGS. 3 and 5.

FIGS. 5 and 6 illustrate additional detail about the embodiment of the flexible membrane 306 shown in FIGS. 3-4. FIG. 5 is a partially exploded view of the flexible membrane 306, and FIG. 6 is a schematic section view taken from Box 6 in FIG. 4. FIGS. 5 and 6 are not to scale and do not show all parts in order to provide greater clarity.

The flexible membrane 306 can comprise a first layer 500 and a second layer 502. The second layer 502 can comprise a set of flexible discs or pucks 504 configured to be individually attached to the bottom surface of the first layer 500.

The first layer 500 can comprise a set of conductive structures 506, and the pucks 504 each comprise one or more conductive structures 508. The second layer 502 can alternatively include a sheet of material laterally interconnecting the pucks 504 to each other without covering the conductive structures 508, 522 in the pucks 504. The conductive structures 506 of the first layer 500 are in electrical communication with a controller connection 510 which provides an electrical connection to a controller (e.g., a processor or keyboard controller configured to receive switch signals and/or to send keycodes to a computer or other electronic device).

The first layer 500 can comprise a flexible, unitary, fluid-tight material to provide the fluid-tightness described in connection with FIGS. 3-4. The conductive structures 506 can be positioned on a surface of, or extend within or through, the first layer 500 to provide continuous conductive traces or leads, similar to traces in a PCB. As shown in FIG. 6, the conductive structure 506 is located on the bottom surface of the first layer 500 in this embodiment. In some embodiments, the first layer 500 can have a thickness between about 25 microns and about 200 microns, and in some cases the first layer 500 can have a thickness of about 50 microns. The conductive structures 506 can be flexible so that flexure of the first layer 500 does not break or disable electrical communication through the conductive structures 506.

The first layer 500 can comprise a set of attachment points 512 on its bottom surface where the pucks 504 of the second layer 502 are attached. Each attachment point 512 can have its own unique conductive structure 506, or, as shown in FIG. 5, a single conductive structure 506 can pass through or over multiple attachment points 512. Each puck 504 can be attached to a unique attachment point 512 at the upper surface of the puck 504, such as at the upper surface of the puck 504 and around the top perimeter of the puck 504. Each attachment point 512 can correspond to the location of a key in the keyboard. Thus, the attachment points 512 can be distributed in a keyboard layout across the first layer 500. The conductive structure 506 through each attachment point 512 can be configured to align with the conductive structures 508 in the pucks 504.

The pucks 504 can comprise a cup-like shape wherein a horizontal lower membrane 514 is connected to a hollow, vertical, cylindrical spacer 516. The lower membrane 514 and spacer 516 can be separate parts or can be formed integrally as a single piece. Similarly, the pucks 504 can each be a separate piece from the first layer 500 or can be an integral part of the first layer 500. The pucks 504 and first layer 500 can comprise PET or a similar material with low compressibility and high resistance to the effects of compression fatigue.

The pucks 504 can comprise a flexible material similar to, or the same as, the first layer 500. In some embodiments, the lower membrane 514 can have a thickness between about 25 microns and about 200 microns, and in some cases the lower membrane 514 can have a thickness of about 50 microns. In some embodiments, the spacer 516 can have a thickness between about 75 microns and about 150 microns, and in some cases the spacer 516 can have a thickness of about 75 microns. The spacer 516 can comprise a flexible material such as a pressure-sensitive adhesive (PSA), a thermoplastic polymer (e.g., polyethylene terephthalate (PET)), related material, and combinations thereof.

When the puck 504 is attached to the first layer 500, an internal void 518 can be formed. See FIG. 6. The void 518 is between the conductive structure 506 on the first layer 500 and the conductive structure 508 on the lower membrane 514. The void 518 can provide a non-conductive air gap between the conductive structures 506, 508 so that there is no electrical communication between the conductive structures 506, 508 when they are in the unactuated or neutral condition shown in FIG. 6.

When a downward force is applied to the keycap 103, pressure is applied to the flexible membrane 306 that causes the membrane 306 to deform. The pressure can come from a combination of the downward movement of the entire membrane 306 (as the keycap 103 moves) and localized pressure against the lower membrane 514 of the puck 504. The localized pressure can be applied by a portion of the dome 310 (e.g., localized around directional arrow 520 in FIG. 6 upon collapse or deformation of the dome 310). This pressure against the lower membrane 514 can urge the conductive structures 506, 508 together, thereby producing an electrical path through a first conductive structure 506 of the first layer 500 and into the conductive structure 508. The conductive structure 508 is electrically connected to another conductive structure 522 in the spacer 516 that is connected to another conductive structure 506 of the first layer 500. Thus, conductive structures in the flexible membrane 306 can form a collapsible switch that is actuated upon application of a downward force on the keycap 103. All of the electrical connections for the switch can be located within the membrane 306 and can extend just below the keycap 103 and above the set of support structures below the membrane 306 (e.g., the key stabilizer 308, dome 310, and dome support 312).

In some embodiments (not shown), the dome 310 can be integrally formed with the puck 504. Thus, portions of the dome can deform to engage other portions of the dome (e.g., portions corresponding to the lower membrane 514) that bear conductive structures (e.g., 508).

The puck 504 can have a lateral width less than the width W of the keycap 103, as shown in FIG. 4. In some embodiments, the puck 504 comprises a lateral width about equal to or greater than the lateral width W of the keycap 103. This configuration can be beneficial when the puck 504 is used to distribute light under the keycap 103 since the puck 504 can therefore help distribute light around the perimeter of the keycap 103 more effectively.

Figure 8:
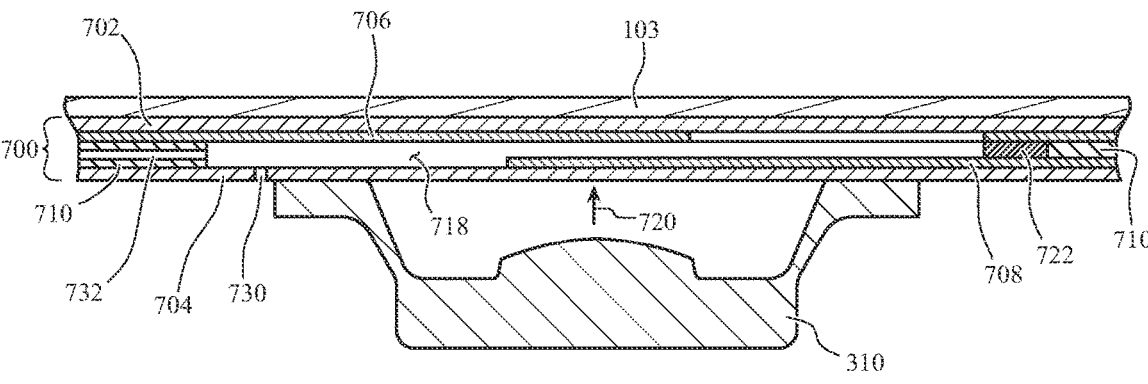
FIG. 8 is a side section view of a key assembly having the membrane of FIG. 7.
Figure 7:
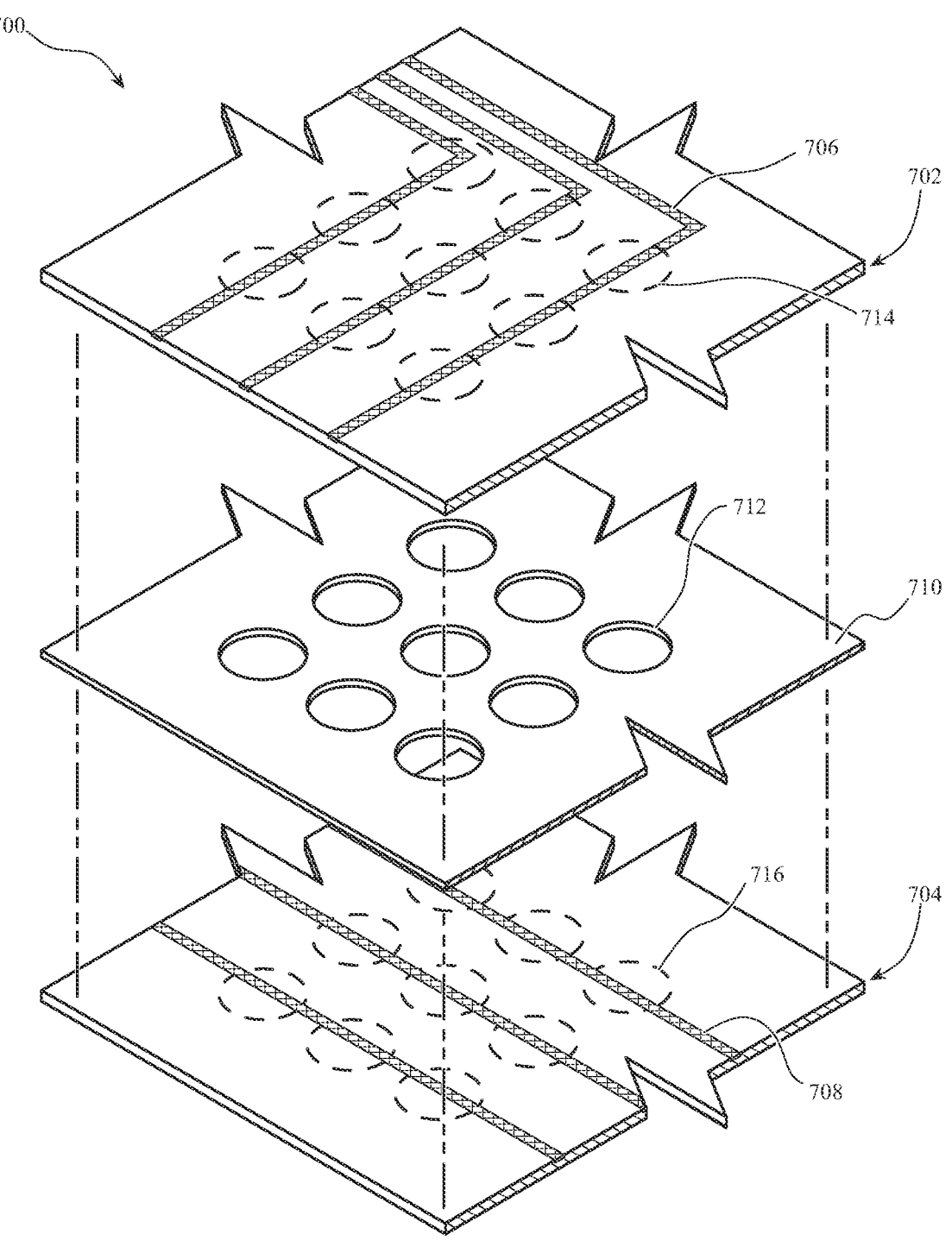
FIG. 7 is an exploded view of a membrane according to an embodiment of the present disclosure.

FIGS. 7 and 8 illustrate another embodiment of a flexible membrane 700 that can be used in the keyboard assembly 300. FIG. 7 shows an exploded view of a portion of the membrane 700, and FIG. 8 shows a section view comparable to FIG. 6. The flexible membrane 700 can comprise a first layer 702 and a second layer 704. Each of these layers 702, 704 can have a construction and material makeup comparable to the first layer 500, wherein they comprise sets of conductive structures 706, 708. The flexible membrane 700 can also include a spacer layer 710 positioned between the first and second layers 702, 704. The spacer layer 710 can include a set of openings or apertures 712 corresponding to the position of each key in a keyboard. Thus, the apertures

712 can be distributed in a keyboard layout across the flexible membrane 700. Each of the first and second layers 702, 704 can have corresponding attachment areas 714, 716 where the apertures 712 of the spacer layer 710 are located.

The flexible membrane 700 can have the first layer 702 attached to (e.g., adhered or bonded to) the spacer layer 710, and the spacer layer 710 can be attached to the second layer 704. Accordingly, due to the presence of the apertures 712, a set of voids 718 can be formed within the membrane 700, between the first layer 702 and the second layer 704, comparable to the voids 518 of membrane 306. See FIG. 8. The conductive structures 706, 708 can be configured to vertically cross-over each other where they are spaced apart by the voids 718.

The voids 718 can lie between the conductive structures 706, 708 where the keycaps 103 are located, and the voids 718 can be collapsed by deflection of the first and second layers 702, 704 toward each other. For example, the a portion of the dome 310 can be displaced relative to the flexible membrane 700 such that it applies localized pressure to second layer 704 in direction 720, as indicated in FIG. 8, to cause contact and electrical communication between the conductive structures 706, 708 within the void 718. In some embodiments, a conductive structure 706 of the first layer 702 can be electrically connected to a conductive structure 708 of the second layer 704 by a bridging conductive structure 722 extending through the spacer layer 710.

In some embodiments, the dome 310 can be integrally formed with the second layer 704. Thus, the second layer 704 can include collapsible domes rather than the domes 310 being attached to the bottom surface of the second layer 704.

A flexible membrane 700 having multiple layers (i.e., 702, 704, 710) can be beneficial due to providing multiple layers on which the conductive structures 706, 708 can be positioned. The conductive structures 706 on the first layer 702 can extend across the same vertical positions as the conductive structures 708 on the second layer 704, so the number of jumpers, bridges, or similar structures in the membrane 700 can be reduced or eliminated. All of the conductive structures 706, 708 can be in electrical communication with a controller connection. Additionally, the conductive structures 706, 708 (and 506) can include diodes, resistors, and related electrical components commonly found in keyboards (not shown) in order to assist in uniquely identifying each key press differently at the controller or to limit back-fed signals through the flexible membrane.

In some embodiments, the membrane 700 can comprise a single layer combining the three above-indicated layers 702, 704, 710 into one. For example, the first and second layers 702, 704 and the spacer layer 710 can all be an integral part of each other and a single piece of material rather than being multiple layers attached to each other. For example, the membrane can comprise the single layer, and voids (similar to 718) can be formed within the thickness of the single layer between locations where traces (e.g., 706, 708) can intersect or contact upon collapse of the voids. In another example, the spacer layer 710 and second layer 704 can be omitted, and the conductive structures 706 can extend across on a single membrane 702 with a set of jumpers and insulating spacers that can separate the conductive structures 706 similar to how the voids 718 separate conductive structures 706, 708. The insulating spacers can hold an air gap between the conductive structures 706 that can be closed when a force is applied to the membrane 700 at the spacers. These insulating spacers can be configured to withstand stretching. In some configurations, the insulating spacers are resilient and do not break or lose their electrical insulating properties upon being deformed in a switch press event.

Figure 9:
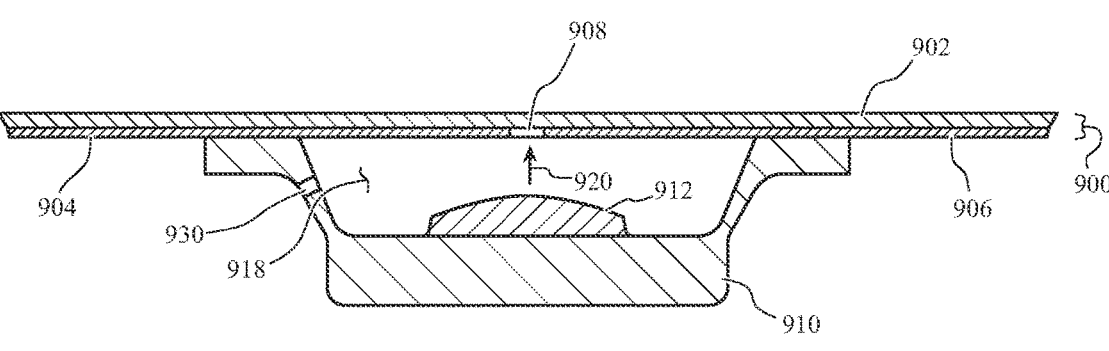
FIG. 9 is a side section view of a key assembly of another embodiment of the present disclosure.

FIG. 9 illustrates a section view of another embodiment of a flexible membrane 900. In this case, the membrane 900 comprises a single layer 902 having conductive structures 904, 906 separated from each other by a gap 908 on the layer 902. A dome 910 is attached to the membrane 900 and comprises a conductive portion 912. In this embodiment, when the key is depressed at the dome 910, the dome 910 collapses resulting in relative displacement of the conductive portion 912 toward the conductive structures 904, 906 in direction 920. Upon sufficient deflection, the conductive portion 912 engages both conductive structures 904, 906 and thereby permits electrical communication between the conductive structures 904, 906. Accordingly, the conductive portion 912 can close a circuit with the conductive structures 904, 906 and enable an electrical signal using the conductive structures 904, 906. The flexible membrane 900 can be simpler and less costly to construct than other membranes because it only requires a single layer 902 of material and a set of domes 910.

In various embodiments disclosed herein, the flexible membrane (e.g., membranes 306, 700, and 900) can comprise internal voids (e.g., voids 518, 718, and 918). When the membranes are deformed, air in the voids can be compressed due to the change in shape of the voids. The compression can provide resistance to the deformation of the membranes.

In some embodiments, the voids 518, 718, and 918 are vented so that air can escape with little or no hindrance to the deformation. Thus, example venting features are shown in FIGS. 6, 8, and 9, wherein a bottom or side vent opening 530, 532, 730, 732, 930 can allow air to escape the internal void through the bottom or side wall of the membrane or dome that forms a boundary for the internal void. Each internal void can comprise one or more of the vent openings shown in these figures or vent openings configured to serve a similar function.

The bottom and side vent openings 530, 532, 730, 732, 930 can be referred to as exit openings or atmosphere exit openings since they can be configured to vent air to the atmosphere external to and surrounding the keyboard assembly. Accordingly, air pushed out through an exit opening or atmosphere exit opening can be replaced by substantially different air when the membrane elastically returns to its unactuated or undeformed state and draws in air from atmosphere through the exit opening. The air in the internal voids is part of a system open to atmosphere external to the membrane/domes instead of being part of a closed pneumatic system. In some arrangements, the exit opening or atmosphere exit is positioned through the bottom or side of the membrane in order to preserve the fluid-tightness of the upper surface of the membrane.

In other embodiments, the vent opening 732 can be referred to as a distribution opening or closed distribution openings, wherein air exiting the internal void 718 is forced into other parts of the membrane or keyboard (e.g., to other internal voids in the membrane). The air in this case can be contained in a closed pneumatic system wherein air forced out of the internal voids 718 is replaced by air from within the same system. In some arrangements, the air can be pressed through an indirect or torturous path between different parts of the closed system.

In some embodiments, a hybrid system is implemented, wherein the membrane comprises a set of fluidly interconnected internal voids and at least one exit opening or atmosphere exit opening. Thus, the system can be designed with a mostly contained system of air that is still able to vent to atmosphere if needed. This can be advantageous when the membrane is moved between different atmospheric pressures so that the pressure within the membrane stays within predetermined limits. For example, the pressure in the voids can be maintained to avoid a low pressure situation where the voids collapse and cause unwanted electrical contact between conductive parts of the flexible membrane.

Another aspect of the disclosure includes methods for manufacturing flexible membranes described herein. In one embodiment, a sheet of flexible material (e.g., the material used in the first layer 500 or layers 702, 704, or 900) is provided. The material can be generally flat with a single thickness. The material can be embossed into shapes (e.g., the raised portions shown in FIGS. 4, 10, 11, 13, and 14). The embossed shapes can correspond to the various sizes and shapes of the keycaps 103 used with the membrane or the positions of an interstitial layer relative to a set of keycaps.

Next, conductive structures (e.g., structures 506, 706, 708) can be added to the embossed membrane. For example, conductive traces (e.g., silver traces) can be added to different parts of the membrane using a printing process. For instance, a three-dimensional inkjet can be used to add a matrix of conductive material to the outer surfaces of the membrane. The conductive structures can provide electrical communication between each key and a keyboard controller. In some embodiments, this process can be repeated for each layer in the membrane and then the membrane can be assembled. In other cases, the process can be performed after all of the layers of the membrane have previously been attached to each other.

In another embodiment, a flexible sheet of material (or a preassembled entire membrane) is provided, and the conductive structures can be added while the material is generally flat and unshaped. For example, an inkjet or screen printing process can apply conductive material as conductive traces to the surfaces of the flexible membrane. The sheet can then be re-shaped (e.g., embossed). The material used for the conductive structures can therefore be designed with flexibility or capability of elongation and bending in order to ensure that the conductive structures are not broken when the membrane is embossed.

In still another embodiment, the sheet of material can be pre-impregnated or coated with conductive material in an embossed or un-embossed configuration. An acid etching process, laser-etching process, or similar removal process can then be used to eliminate conductivity where it is not needed on the membrane, and the non-removed conductive structures can remain on the membrane afterward where they are needed.

In yet another embodiment, a molding process can be used to create the membrane. Conductive material (e.g., a decoration or in-mold film having conductive structures) can be applied to the inner surfaces of the mold. Afterward, the membrane material can be added to the mold so that the conductive structures are bonded to the membrane material when they are demolded.

Figure 10:
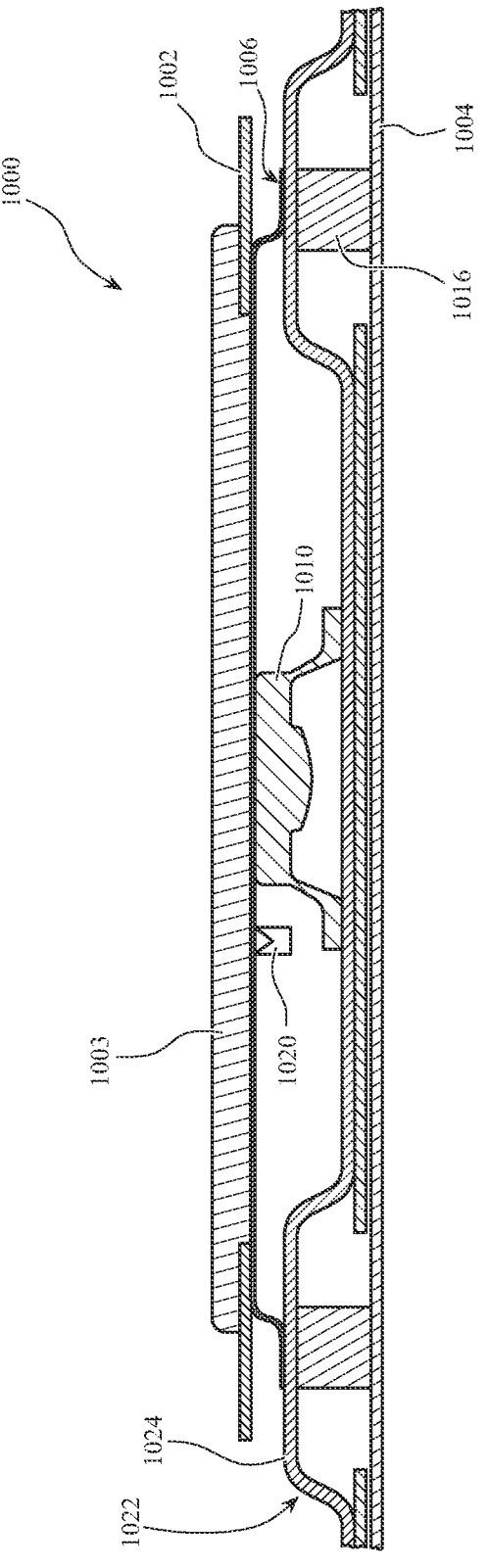
FIG. 10 is a side section view of a key assembly of another embodiment of the present disclosure.

FIG. 10 illustrates a section view of an alternate embodiment of a keyboard assembly 1000 comparable to keyboard assembly 300. In this embodiment, parts having similar numbers correspond to their counterparts in FIGS. 3-4 and can have similar features. The assembly 1000 can comprise a lower flexible membrane 1022 in addition to the upper flexible membrane 1006. The lower flexible membrane 1022 can extend across the keyboard assembly 1000 below the dome 1010 and upper flexible membrane 1006. The lower flexible membrane 1022 can be configured with raised portions 1024 that extend over the top of the web 1016. Thus, the keyboard assembly 1000 can have the web 1016 directly attached to the base layer 1004 without having to break continuity of the lower flexible membrane 1022 for the web 1016 to extend through it.

The upper and lower flexible membranes 1006, 1022 can each have sets of electrically conductive structures running through them, and each of the flexible membranes 1006, 1022 can be used for different purposes in the keyboard assembly 1000. For instance, the upper flexible membrane 1006 can be configured to provide support for the interstitial layer 1002 (e.g., in the manner explained above in connection with interstitial layer 302) and to support and provide electrical connections for a light source 1020 on the upper flexible membrane 1006. The lower flexible membrane 1022 can include its own conductive structures configured to function as switches upon collapse of the dome 1010, as described above in connection with the flexible membrane embodiments of FIGS. 4-9.

Accordingly, different flexible membranes can provide different supporting and electrical functions in the keyboard assembly 1000. The upper membrane 1006 can be optimized to provide lighting and support for the interstitial layer 1002 since it is located closer to the keycap 1003 and interstitial layer 1002, and the lower membrane 1022 can be optimized to provide switches for the keyboard assembly 1000 since it is closer to the base layer 1004 and can therefore be easier to connect to other electrical components in the lower section of the keyboard assembly 1000.

One or both of the flexible membranes 1006, 1022 can prevent fluid penetration through the keyboard assembly 1000. Thus, in embodiments where both membranes 1006, 1022 prevent fluid penetration, each can act as a backup layer of protection for the keyboard when the other fails. Additionally, the separate membranes can be optimized in size and thickness for their individual functions. If just one of the membranes 1006, 1022 supports lighting, its shape, thickness, and material composition can be optimized to enhance the diffusion or reflection of light from the light source 1020 to where it is desired. For example, it can comprise a transparent material while the other membrane 1006, 1022, which does not serve a lighting distribution function, comprises an opaque material.

Figure 11:
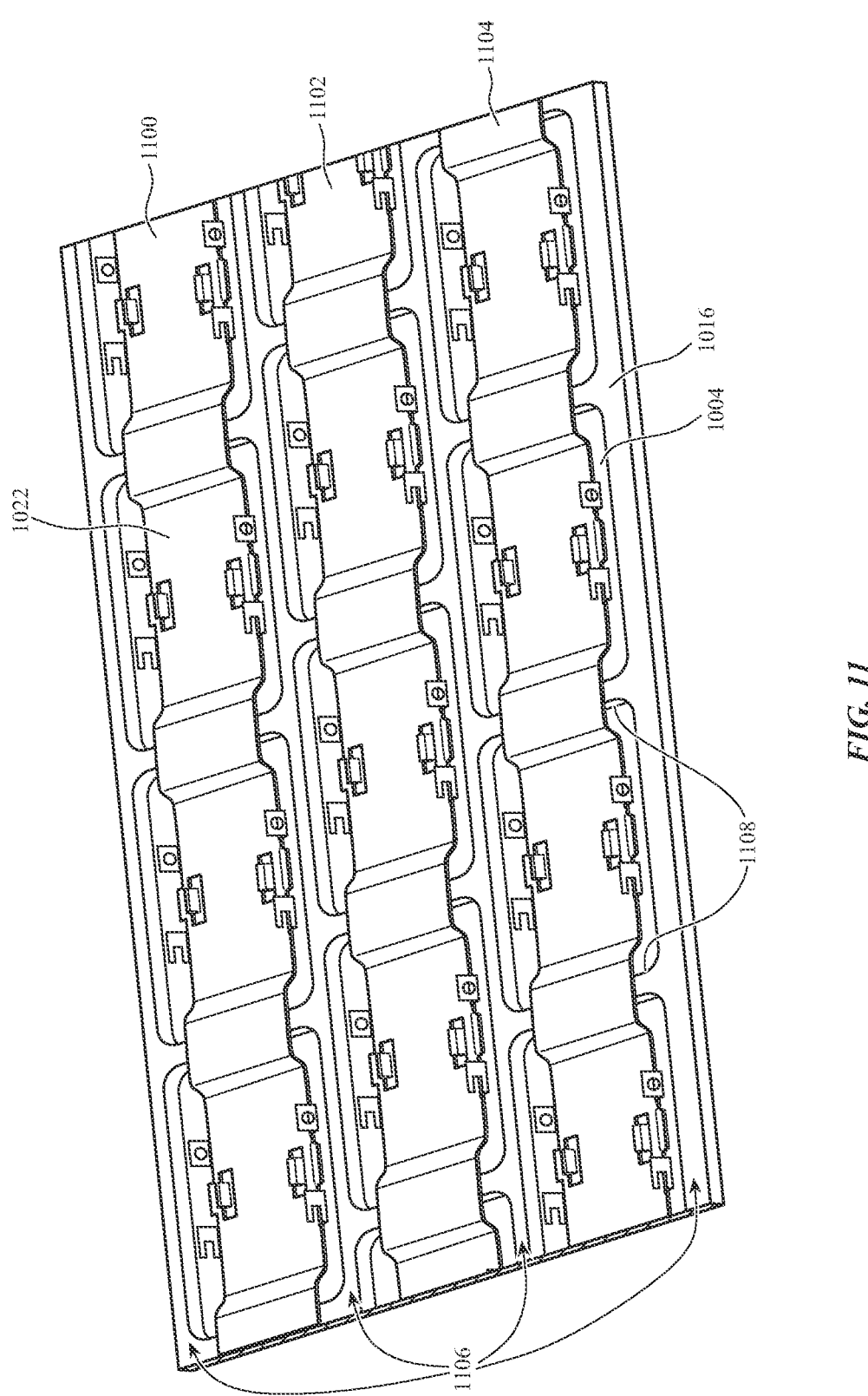
FIG. 11 is an isometric view of a keyboard assembly of the embodiment of FIG. 10.

As shown in FIG. 11, at least one of the flexible membranes of the keyboard assembly 1000 (in this case, the lower flexible membrane 1022) can be arranged in a set of strips or rows 1100, 1102, 1104 across the base layer 1004 and the web 1016 of the keyboard. The rows 1100, 1102, 1104 can alternatively be configured as columns.

Each of the rows 1100, 1102, 1104 can provide its own conductive structures for the key assemblies it supports, and portions of the membrane 1022 are omitted between the rows 1100, 1102, 1104. This configuration can be beneficial when the base layer 1004 and web 1016 need to be designed with increased stiffness because the membrane 1022 does not extend over portions of the web 1016. Thus, those uncovered web portions (e.g., portions 1106) can be thickened relative to membrane-covered portions of the web 1016 (e.g., portions 1108) since there does not need to be extra space between the interstitial layer 1002 and the web portions 1106 for the membrane 1022.

Figure 12:
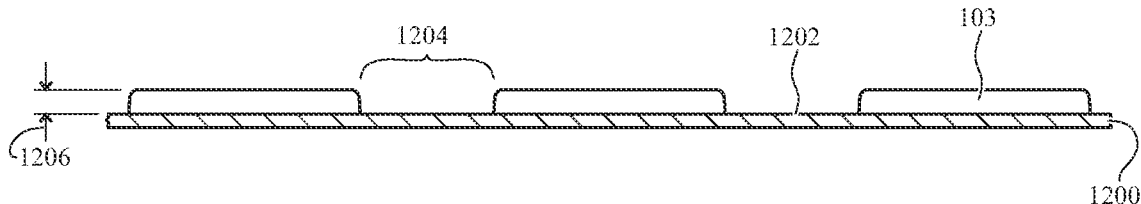
FIGS. 12-14 show side views of various membrane and keycap embodiments of the present disclosure.
Figure 13:
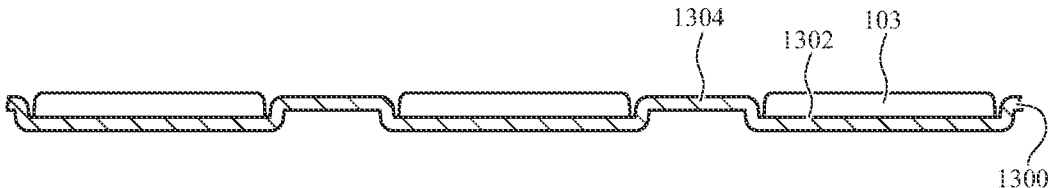
Figure 14:
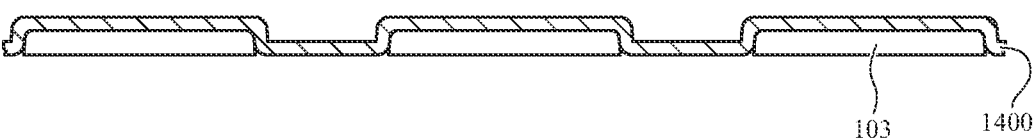

FIGS. 12-14 illustrate multiple embodiments showing alternate relationships between keycaps 103 and a flexible membranes 1200, 1300, 1400. The flexible membranes 1200, 1300, 1400 can be one of the other flexible membranes disclosed herein (e.g., membranes 306, 700, 900, and 1006).

Thus, each of these flexible membranes 1200, 1300, 1400 can provide conductive structures, lighting, etc.

In FIG. 12, the flexible membrane 1200 comprises a flat top surface 1202 in an unactuated or neutral state. The keycaps 103 are placed on the flat top surface 1202 with spaces (e.g., 1204) between each other. The keycaps 103 therefore have an offset height 1206 relative to the flat top surface 1202 that is substantially equal to the entire thickness of the keycap 103. This can provide excellent key definition for the user since each keycap 103 is clearly spaced from its neighboring keys. This embodiment can also make the membrane 1200 easy to clean due to the wide spaces 1204 between keycaps 103.

In FIG. 13, the flexible membrane 1300 comprises a set of recesses 1302 in its top surface 1304 in which the keycaps 103 are located. In this embodiment, the top surface 1304 of the membrane 1300 that lies between the keycaps 103 is nearly the same height as the height of the keycap 103 relative to the top surface of a recess 1302. The top surfaces of the keycaps 103 can still be slightly raised relative to the top surface 1304 of the membrane 1300. This embodiment can provide a relatively smooth travel surface of fingers sliding laterally across the top surface 1304 and keycaps 103. Additionally, lighting can be directed close to the perimeters of the top surfaces of the keycaps 103. This configuration can also provide additional space below the membrane 1300 since the top surface 1304 is raised relative to the recesses 1302.

In FIG. 14, the flexible membrane 1400 can extend over the top surfaces of the keycaps 103. This embodiment can be used to protect the keycaps 103 and to give the top surface of the keyboard a consistent material appearance and finish. Additionally, the feel of the surface of the keyboard can be more compliant and flexible since it is based on the material used in the flexible membrane 1400 rather than being based on the material used in the keycaps 103.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A button for an electronic device, comprising:
a button cap;
an elastic support layer attached to and contacting the button cap, the elastic support layer having a set of conductive traces providing conductive paths across the elastic support layer;
a set of support structures supporting the elastic support layer and the button cap, the set of support structures including a hinge mechanism configured to limit rotational movement of the button cap relative to a horizontal plane;
wherein upon application of a force to the elastic support layer, the elastic support layer deforms to enable electrical communication between two conductive paths in the set of conductive traces.

2. The button of claim 1, wherein application of the force causes the two conductive paths of the set of conductive traces to contact each other.

3. The button of claim 1, wherein application of the force causes a bridge conductor to electrically contact the two conductive paths.

4. The button of claim 3, wherein the bridge conductor is positioned on a collapsible dome.

5. The button of claim 1, wherein the set of support structures comprises a collapsible dome configured to deform upon application of the force.

6. The button of claim 1, wherein the elastic support layer comprises a collapsible dome portion.

7. The button of claim 1, further comprising a flexible layer positioned around a perimeter of the button cap, the flexible layer being supported by the elastic support layer.

8. The button of claim 1, wherein the button cap is positioned on an upper side of the elastic support layer.

9. The button of claim 1, wherein the button cap is positioned on an underside of the elastic support layer.

10. A keyboard, comprising:

a housing having a rigid web portion;

a first flexible support layer having a lower portion and a raised portion, the raised portion being raised relative to the lower portion and positioned above the rigid web portion, the lower portion being attached to the rigid web portion of the housing;

at least two keycaps, the at least two keycaps including a keycap positioned above the raised portion of the first flexible support layer;

a second flexible support layer defining a top surface of the keyboard between the at least two keycaps, being directly attached to two adjacent keycaps of the at least two keycaps, being in contact with a top surface of the raised portion of the first flexible support layer, and being vertically spaced above and positioned over the lower portion of the first flexible support layer.

11. The keyboard of claim 10, wherein application of a force to the keycap of the at least two keycaps causes the keycap to travel and deform the first and second flexible support layers without the travel being limited by the rigid web portion.

12. The keyboard of claim 10, wherein the second flexible support layer comprises a fabric material.

13. The keyboard of claim 10, further comprising a third flexible support layer and a keycap support, the third flexible support layer being positioned between the keycap support and the housing.

14. The keyboard of claim 10, further comprising a dome, wherein the rigid web portion extends from a base layer, wherein the dome is positioned between the base layer and the first flexible support layer.

15. A keyboard, comprising:

a base layer;

a rigid web extending upward from the base layer;

a flexible membrane having a first portion raised relative to a second portion;

a set of keycaps, at least one keycap of the set of keycaps being positioned at least partially over the first portion of the flexible membrane;

an interstitial layer positioned over the first portion of the flexible membrane and spaced above the rigid web, the interstitial layer extending horizontally between the at least one keycap and a second keycap of the set of keycaps, the interstitial layer defining an opening positioned underneath the at least one keycap and above the flexible membrane; and a dome positioned between the base layer and the flexible membrane.

16. The keyboard of claim 15, wherein the interstitial layer is flat between the at least one keycap and the second keycap.

17. The keyboard of claim 15, further comprising a second flexible membrane having an upper portion positioned on the rigid web and a lower portion extending between the at least one keycap and the base layer.

18. The keyboard of claim 15, further comprising a second flexible membrane having a lower portion positioned on the second portion of the flexible membrane and an upper portion extending between the at least one keycap and the base layer.

19. The keyboard of claim 15, further comprising a light source on the flexible membrane.

20. The keyboard of claim 15, wherein the flexible membrane comprises a set of conductive structures configured to function as at least one switch in response to movement of the at least one keycap relative to the base layer.

\* \* \* \* \*